(12) United States Patent  
Chao

(10) Patent No.: US 9,281,504 B2
(45) Date of Patent: Mar. 8, 2016

(54) METHOD FOR FABRICATING BATTERY SHELL

(75) Inventor: Po-Tsun Chao, Taipei (TW)

(73) Assignee: Getac Technology Corporation, Hsinchu County (TW)

(*) Notice: Subject to any disclaimer, the term of this patent is extended or adjusted under 35 U.S.C. 154(b) by 545 days.

(21) Appl. No.: 13/619,537

(22) Filed: Sep. 14, 2012

(65) Prior Publication Data

US 2013/0147088 A1 Jun. 13, 2013

Related U.S. Application Data

(60) Provisional application No. 61/568,095, filed on Dec. 7, 2011.

(30) Foreign Application Priority Data

Mar. 19, 2012 (CN) .......................... 2012 1 0072445

(51) Int. Cl.
*B29C 45/14* (2006.01)
*H01M 2/10* (2006.01)
*H01M 2/20* (2006.01)

(52) U.S. Cl.
CPC ............ *H01M 2/1022* (2013.01); *H01M 2/204* (2013.01)

(58) Field of Classification Search
None
See application file for complete search history.

(56) References Cited

U.S. PATENT DOCUMENTS

| | | | | | |
|---|---|---|---|---|---|
| 3,352,721 | A | * | 11/1967 | Lecouffe | 264/279 |
| 3,449,171 | A | * | 6/1969 | Knight | 264/272.21 |
| 3,919,371 | A | * | 11/1975 | Jache | 264/46.6 |
| 3,986,894 | A | * | 10/1976 | Ciliberti, Jr. | 429/153 |
| 4,171,564 | A | * | 10/1979 | Acton et al. | 29/623.2 |
| 8,216,502 | B2 | * | 7/2012 | Hermann et al. | 264/272.21 |

FOREIGN PATENT DOCUMENTS

| | | |
|---|---|---|
| CN | 201118265 Y | 9/2008 |
| CN | 101471520 A | 7/2009 |

* cited by examiner

*Primary Examiner* — Edmund Lee

(57) ABSTRACT

A non-contact input apparatus for computer peripheral includes an induction module and a pointing module. The induction module includes an electric supply coil and an induction element, and the pointing module includes an energy coil and a non-linear element. The electric supply coil is used to send a first oscillation signal. The energy coil receives the first oscillation signal. The non-linear element converts the first oscillation signal to be a second oscillation signal having multiple higher harmonics. The induction element generates a control signal based on the second oscillation signal.

16 Claims, 6 Drawing Sheets

METHOD FOR FABRICATING BATTERY SHELL

BACKGROUND

1. Technical Field

The disclosure relates to a battery shell, and more particularly to a battery shell where the conductive elements are embedded in the shell.

2. Related Art

Generally, during the manufacturing process of the battery module of an electronic product, a plurality of battery cells and a plurality of metal contacts are electrically combined beforehand to form series connection and parallel connection. Then, the combined battery cells and metal contacts together with the insulating material are packaged in a battery shell to form a battery module.

However, the above manufacturing method needs corresponding room in the battery shell to contain the metal contacts and the insulating material. As a result, the size of the battery shell may be too large and not unfavorable for the miniaturization of the electronic device. Furthermore, the above method may complicate the assembly of a battery module, and thus the working hours and cost may increase.

SUMMARY

In one aspect, a method for fabricating a battery shell is disclosed. The battery shell is configured to contain n battery cells. The number of battery cells in series connection is s. The method comprises providing a plurality of conductive elements which have m contacts, and forming a casing by way of insert molding with the m contacts exposed. The plurality of conductive elements are embedded in the casing. The number m, n, and s comply with the equation of $m=(2\times n)+(s+1)$. The conductive elements are adapted to be connected to the battery cells through the contacts In another aspect, a method for fabricating a battery shell is disclosed. The battery shell is configured to contain n battery cells. The number of battery cells in series connection is s, and s is an even integer. The method comprises providing a plurality of conductive elements which have m contacts, and forming a casing by way of insert molding with the m contacts exposed. The plurality of conductive elements are embedded in the casing. The number m, n, and s comply with the equation of $m=(1.5\times n)+(s+1)$. The conductive elements are adapted to be connected to the battery cells through the contacts In yet another aspect, a method for fabricating a battery shell. The battery shell is configured to contain n battery cells. The number of battery cells in series connection is s and the number of battery cells in parallel connection is p, wherein s is an odd integer. The method comprises providing a plurality of conductive elements which have m contacts; and forming a casing by way of insert molding with the m contacts exposed. The plurality of conductive elements are embedded in the casing. The number m, n, s, and p comply with the equation $m=(1.5\times n)+(s+1+0.5p)$. The conductive elements are adapted to be connected to the battery cells through the contacts

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
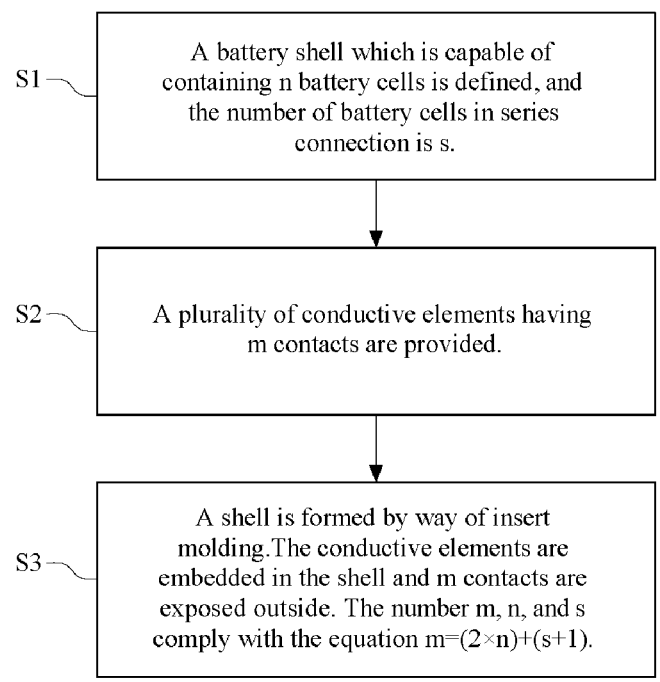
FIG. 1 is a flowchart of a method for fabricating a battery shell according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

FIG. 1 is a flowchart of a method for fabricating a battery shell according to a first embodiment of the disclosure.

The method comprises the following steps.

A battery shell which is capable of containing n battery cells is defined, and the number of battery cells in series connection is s (S1).

A plurality of conductive elements are provided, and the conductive elements have m contacts (S2). Herein n, s, and m are all positive integers.

A shell is formed by way of insert molding, and the conductive elements are embedded in the shell and the m contacts are exposed outside. Furthermore, the number m, n, and s comply with the equation (1).

$$m=(2\times n)+(s+1) \quad\quad (1)\,(S3)$$

Figure 2:
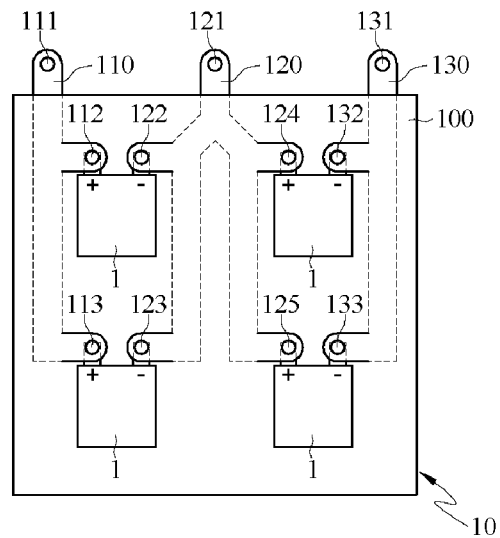
FIG. 2 is a structural diagram of a battery shell which is fabricated by the method of the first embodiment.

FIG. 2 is a structural diagram of a battery shell which is fabricated by the method of the first embodiment.

With reference to FIG. 2, the battery shell 10 can be used in a laptop, but it is not limited this way. The battery shell 10 comprises 4 battery cells 1. The number of battery cells 1 in series connection is two, and the number of battery cells 1 in parallel connection is also two.

The battery shell 10 comprises a casing 100, a first conductive element 110, a second conductive element 120, and a third conductive element 130. The first conductive element 110, the second conductive element 120, and the third conductive element 130 may be made of copper or nickel material, while the casing 100 may be made of insulation plastic.

The first conductive element 110, the second conductive element 120, and the third conductive element 130 are embedded in the casing 100 by way of insert molding. The first conductive element 110 has a power source contact 111 and two positive pole contacts 112 and 113. The second conductive element 120 has a test contact 121, two positive pole contacts 124 and 125, and two negative pole contacts 122 and 123. The third conductive element has a ground contact 131 and two negative pole contacts 132 and 133. The positive pole contacts 112, 113, 124, and 125 are respectively connected to the positive poles of the battery cells 1. The negative pole contacts 122, 123, 132, and 133 are respectively connected to the negative poles of the battery cells 1. The power source contact 111 and the ground contact 131 are respectively connected to the positive pole and the negative pole of an external electronic device. The test contact 121 may be used to test the voltage of the battery cells 1.

Accordingly, there are 11 contacts provided by the conductive elements. The total number of battery cells 1 is four and the number of battery cells in series connection is two. Therefore, these numbers conform to the equation (1). That is, the method for fabricating a battery shell according to the first embodiment can be implemented.

Figure 3:
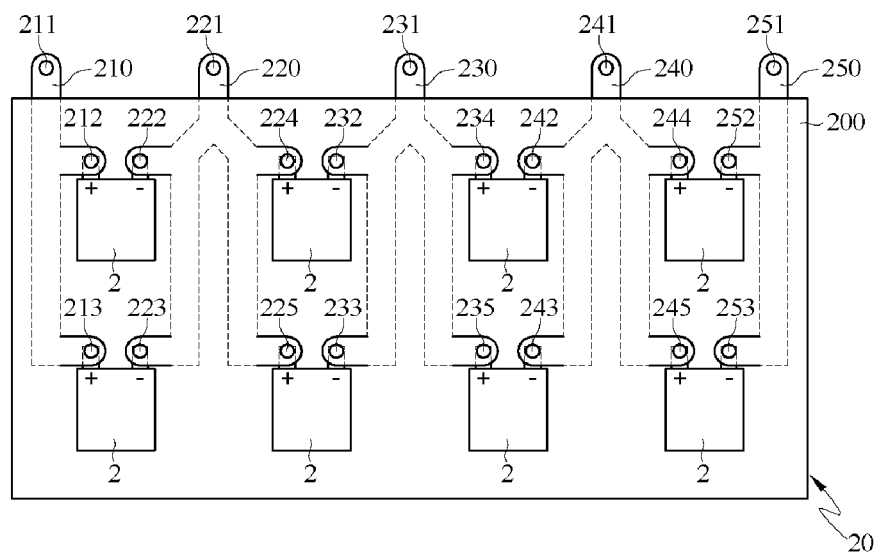
FIG. 3 is a structural diagram of another battery shell which is also fabricated by the method of the first embodiment.

FIG. 3 is a structural diagram of another battery shell which is also fabricated by the method of the first embodiment.

With reference to FIG. 3, the battery shell 20 can be used in a laptop, but it is not limited this way. The battery shell 20 comprises 8 battery cells 2. The number of battery cells 2 in series connection is four, and the number of battery cells 2 in parallel connection is two.

The battery shell 20 comprises a casing 200, a first conductive element 210, a second conductive element 220, a third conductive element 230, a fourth conductive element 240, and a fifth conductive element 250. The first conductive element 110, the second conductive element 120, the third conductive element 130, the fourth conductive element 240, and the fifth conductive element 250 may be made of copper or nickel material, while the casing 200 may be made of insulation plastic. The first conductive element 110, the second conductive element 120, the third conductive element 130, the fourth conductive element 240, and the fifth conductive element 250 are embedded in the casing 200 by way of insert molding. The first conductive element 210 has a power source contact 211 and two positive pole contacts 212 and 213. The second conductive element 220 has a first test contact 221, two positive pole contacts 224 and 225, and two negative pole contacts 222 and 223. The third conductive element 230 has a second test contact 231, two positive pole contacts 234 and 235, and two negative pole contacts 232 and 233. The fourth conductive element 240 has a third test contact 241, two positive pole contacts 244 and 245, and two negative pole contacts 242 and 243. The fifth conductive element 250 has a ground contact 251 and two negative pole contacts 252 and 253.

The positive pole contacts 212, 213, 224, 225, 234, 235, 244, and 245 are respectively connected to the positive poles of the battery cells 2. The negative pole contacts 222, 223, 232, 233, 242, 243, 252, and 253 are respectively connected to the negative poles of the battery cells 2. The power source contact 211 and the ground contact 251 are respectively connected to the positive pole and the negative pole of an external electronic device. The first, second, and third test contacts 221, 231, and 241 may be used to test the voltage of the battery cells 2.

Figure 4:
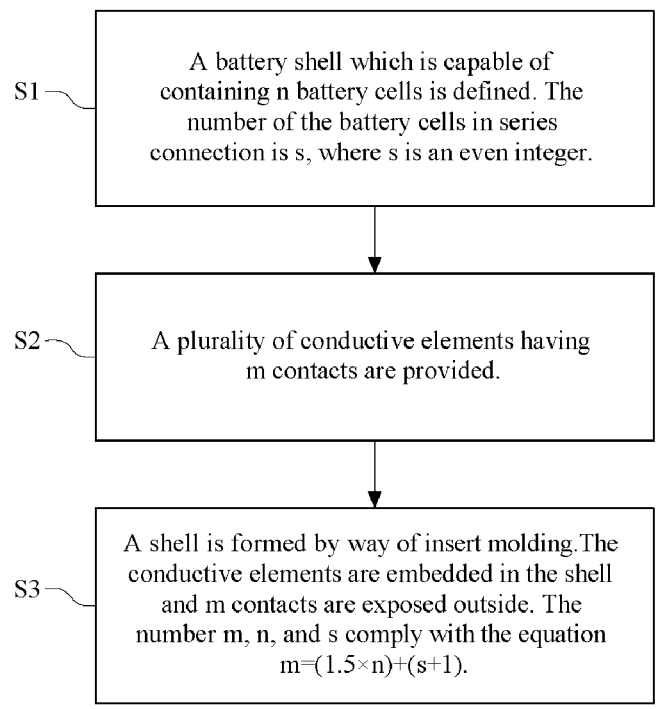
FIG. 4 is a flowchart of a method for fabricating a battery shell according to a second embodiment of the disclosure.

Accordingly, there are 21 contacts provided by the conductive elements. The total of battery cells 2 is eight and the number of battery cells in series connection is four. Therefore, these numbers conform to the equation (1). That is, the method for fabricating a battery shell according to the first embodiment can be implemented. FIG. 4 is a flowchart of a method for fabricating a battery shell according to a second embodiment of the disclosure.

The method comprises the following steps.

A battery shell which is capable of containing n battery cells is defined. The number of the battery cells in series connection is s, where s is an even integer (S1).

A plurality of conductive elements are provided, and the conductive elements have m contacts (S2). Herein n, s, and m are all positive integers.

A shell is formed by way of insert molding, and the conductive elements are embedded in the shell and m contacts are exposed outside. Furthermore, the number m, n, and s comply with the equation (2).

$$m=(1.5\times n)+(s+1) \qquad (2)\,(S3)$$

Figure 5:
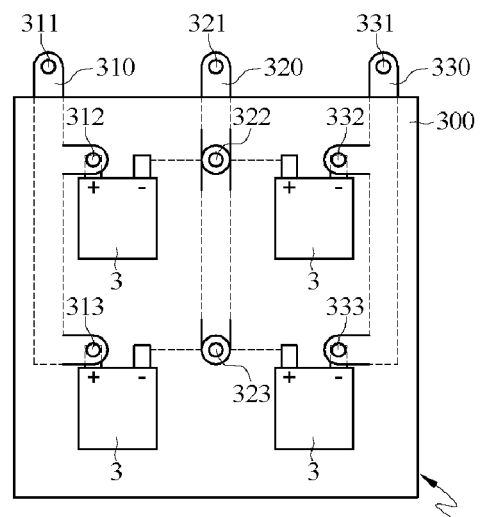
FIG. 5 is a structural diagram of a battery shell which is fabricated by the method of the second embodiment.

FIG. 5 is a structural diagram of a battery shell which is fabricated by the method of the second embodiment.

With reference to FIG. 5, the battery shell 30 can be used in a laptop, but it is not limited this way. The battery shell 30 comprises 4 battery cells 3. The number of battery cells 3 in series connection is two, and the number of battery cells 3 in parallel connection is also two.

Figure 6:
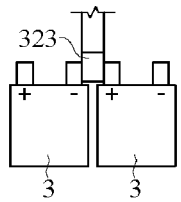
FIG. 6 is a schematic illustration of portion of the battery shell of FIG. 5.

The battery shell 30 comprises a casing 300, a first conductive element 310, a second conductive element 320, and a third conductive element 330. The first conductive element 310, the second conductive element 320, and the third conductive element 330 may be made of copper or nickel material, while the casing 300 may be made of insulation plastic. The first conductive element 310, the second conductive element 320, and the third conductive element 330 are embedded in the casing 300 by way of insert molding. The first conductive element 110 has a power source contact 311 and two positive pole contacts 312 and 313. The second conductive element 320 has a test contact 321 and two negative pole contacts 322 and 323. The third conductive element 330 has a ground contact 331 and two negative pole contacts 332 and 333. The positive pole contacts 312 and 313 are respectively connected to the positive poles of some battery cells 3. The negative pole contacts 332 and 333 are respectively connected to the negative poles of some battery cells 3. The power source contact 311 and the ground contact 331 are respectively connected to the positive pole and the negative pole of an external electronic device. The test contact 321 may be used to test the voltage of the battery cells 3. Each pole contact 322 and 323 is used to connect the positive pole of a battery cell 3 and the negative pole of another battery cell 3. For example, FIG. 6 is a schematic illustration showing connections between the pole contact 323 and two battery cells 3. More particularly, the left side of the pole contact 323 is connected to the negative pole of the left battery cell 3, and the right side of the pole contact 323 is connected to the positive pole of the right battery cell 3.

Accordingly, there are 9 contacts provided by the conductive elements. The total of battery cells 3 is four and the number of battery cells in series connection is two. Therefore, these numbers conform to the equation (2). That is, the method for fabricating a battery shell according to the second embodiment can be implemented.

Figure 7:
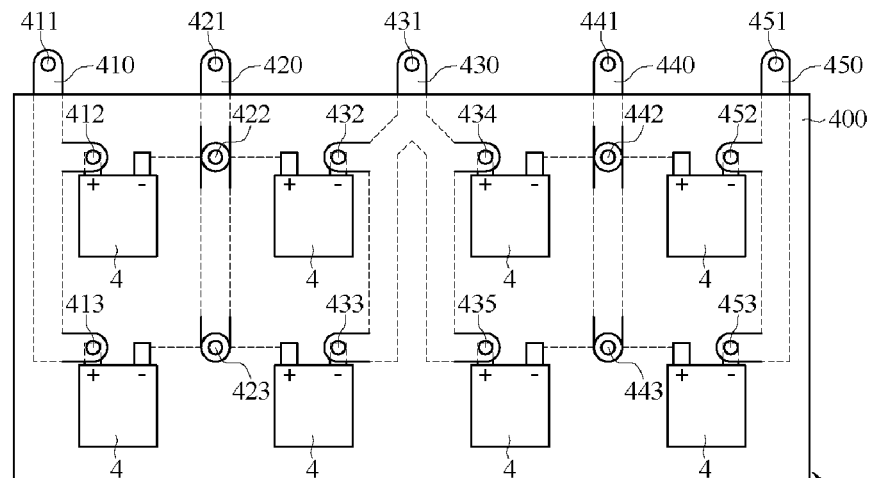
FIG. 7 is a structural diagram of another battery shell which is also fabricated by the method of the second embodiment.

FIG. 7 is a structural diagram of another battery shell which is also fabricated by the method of the second embodiment.

With reference to FIG. 7, the battery shell 40 can be used in a laptop, but it is not limited this way. The battery shell 40 comprises 8 battery cells 4. The number of battery cells 4 in series connection is four, and the number of battery cells 4 in parallel connection is two.

The battery shell 40 comprises a casing 400, a first conductive element 410, a second conductive element 420, a third conductive element 430, a fourth conductive element 440, and a fifth conductive element 450. The first conductive element 410, the second conductive element 420, the third conductive element 430, the fourth conductive element 440, and the fifth conductive element 450 may be made of copper or nickel material, while the casing 400 may be made of insulation plastic. The first conductive element 410, the second conductive element 420, the third conductive element 430, the fourth conductive element 440, and the fifth conductive element 450 are embedded in the casing 400 by way of insert molding. The first conductive element 410 has a power source contact 411 and two positive pole contacts 412 and 413. The second conductive element 420 has a first test contact 421, two pole contacts 422 and 423. The third conductive element 430 has a second test contact 431, two positive pole contacts 434 and 435, and two negative pole contacts 432 and 433. The fourth conductive element 440 has a third test contact 441 and two pole contacts 442 and 443. The fifth conductive element 450 has a ground contact 451 and two negative pole contacts 452 and 453.

The positive pole contacts 412, 413, 434, and 435 are respectively connected to the positive poles of some battery cells 4. The negative pole contacts 432, 433, 452, and 453 are respectively connected to the negative poles of some battery cells 4. The power source contact 411 and the ground contact 451 are respectively connected to the positive pole and the negative pole of an external electronic device. The first, second, and third test contacts 421, 431, and 441 may be used to test the voltage of the battery cells 4. Each pole contact 422, 423, 442, and 443 is used to connect the positive pole of a battery cell 4 and the negative pole of another battery cell 4.

The connections between each pole contact 422, 423, 442, or 443 and battery cells 4 may be referred to those as shown in FIG. 6, and thus they will not be described herein again. Accordingly, there are 17 contacts provided by the conductive elements. The total of battery cells 4 is eight and the number of battery cells in series connection is four. Therefore, these numbers conform to the equation (2). That is, the method for fabricating a battery shell according to the second embodiment can be implemented.

Figure 8:
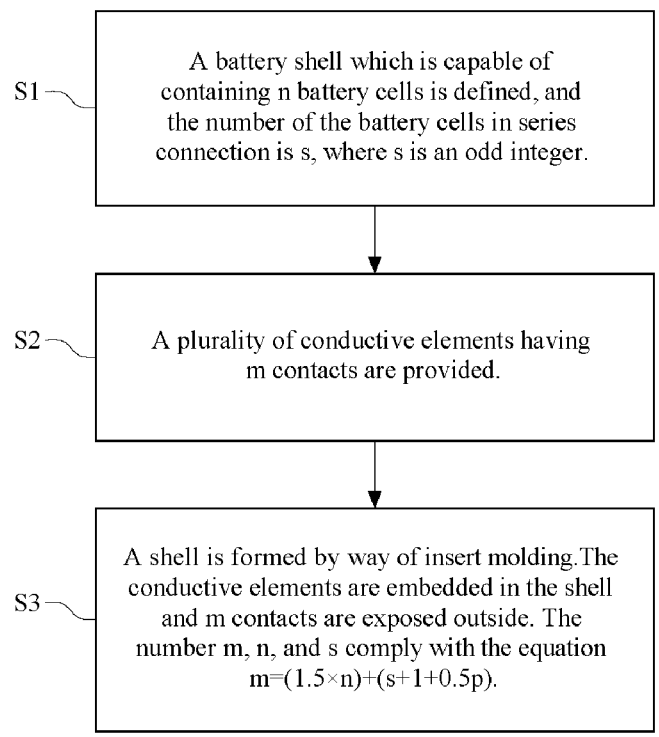
FIG. 8 is a flowchart of a method for fabricating a battery shell according to a third embodiment of the disclosure.

FIG. 8 is a flowchart of a method for fabricating a battery shell according to a third embodiment of the disclosure.

The method comprises the following steps.

A battery shell which is capable of containing n battery cells is defined, and the number of the battery cells in series connection is s, where s is an odd integer (S1).

A plurality of conductive elements are provided, and the conductive elements have m contacts (S2). Herein n, s, and m are all positive integers.

A shell is formed by way of insert molding, and the conductive elements are embedded in the shell and the m contacts are exposed outside. Furthermore, the number m, n, and s comply with the equation (3).

$$m = (1.5 \times n) + (s + 1 + 0.5p) \quad (3) \; (S3)$$

Figure 9:
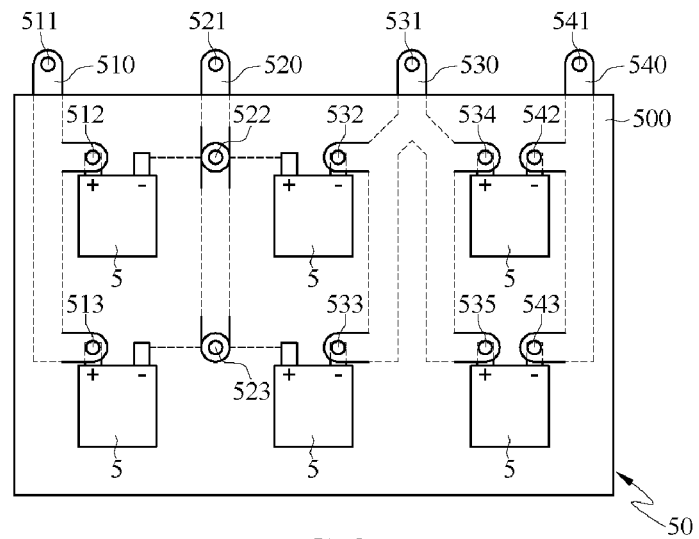
FIG. 9 is a structural diagram of a battery shell which is fabricated by the method of the third embodiment.

FIG. 9 is a structural diagram of a battery shell which is fabricated by the method of the third embodiment.

With reference to FIG. 9, the battery shell 50 can be used in a laptop, but it is not limited this way. The battery shell 50 comprises 6 battery cells 5. The number of battery cells 5 in series connection is three, and the number of battery cells 5 in parallel connection is two.

The battery shell 50 comprises a casing 500, a first conductive element 510, a second conductive element 520, a third conductive element 530, and a fourth conductive element 540. The first conductive element 510, the second conductive element 520, the third conductive element 530, and the fourth conductive element may be made of copper or nickel material, while the casing 500 may be made of insulation plastic. The first conductive element 510, the second conductive element 520, the third conductive element 530, and the fourth conductive element 540 are embedded in the casing 300 by way of insert molding. The first conductive element 510 has a power source contact 511 and two positive pole contacts 512 and 513. The second conductive element 520 has a first test contact 521 and two pole contacts 522 and 523. The third conductive element 530 has a second test contact 531, two positive pole contacts 534 and 535, and two negative pole contacts 532 and 533. The fourth conductive element 540 has a ground contact 541 and two negative pole contacts 542 and 543.

The positive pole contacts 512, 513, 534, and 535 are respectively connected to the positive poles of some battery cells 5. The negative pole contacts 532, 533, 542, and 543 are respectively connected to the negative poles of some battery cells 5. The power source contact 511 and the ground contact 541 are respectively connected to the positive pole and the negative pole of an external electronic device. The first and second test contacts 521 and 531 may be used to test the voltage of the battery cells 5. Each pole contact 522 and 523 is used to connect the positive pole of a battery cell 5 and the negative pole of another battery cell 5.

The connections between each pole contact 522 or 523 and battery cells 5 may be referred to those as shown in FIG. 6, and thus they will not be described herein again.

Accordingly, there are 14 contacts provided by the conductive elements. The total of battery cells 5 is six and the number of battery cells in series connection is three. Therefore, these numbers conform to the equation (3). That is, the method for fabricating a battery shell according to the third embodiment can be implemented.

Figure 10:
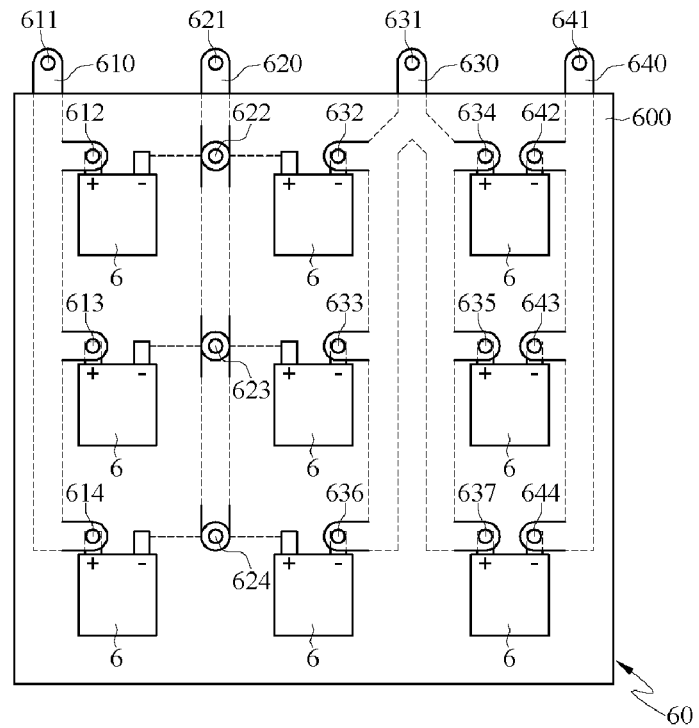
FIG. 10 is a structural diagram of another battery shell which is also fabricated by the method of the third embodiment.

FIG. 10 is a structural diagram of another battery shell which is also fabricated by the method of the third embodiment.

With reference to FIG. 10, the battery shell 60 can be used in a laptop, but it is not limited this way. The battery shell 60 comprises 9 battery cells 6. The number of battery cells 6 in series connection is three, and the number of battery cells 6 in parallel connection is also three.

The battery shell 60 comprises a casing 600, a first conductive element 610, a second conductive element 620, a third conductive element 630, and a fourth conductive element 640. The first conductive element 610, the second conductive element 620, the third conductive element 630, and the fourth conductive element 640 may be made of copper or nickel material, while the casing 600 may be made of insulation plastic. The first conductive element 610, the second conductive element 620, the third conductive element 630, and the fourth conductive element 640 are embedded in the casing 600 by way of insert molding. The first conductive element 610 has a power source contact 611 and three positive pole contacts 612, 613, and 614. The second conductive element 620 has a first test contact 621 and three pole contacts 622, 623, and 624. The third conductive element 630 has a second test contact 631, three positive pole contacts 634, 635, and 637, and three negative pole contacts 632, 633, and 636. The fourth conductive element 640 has a ground contact 641 and three negative pole contacts 642, 643, and 644.

The positive pole contacts 612, 613, 614, 634, 635, and 637 are respectively connected to the positive poles of some battery cells 6. The negative pole contacts 632, 633, 636, 642, 643, and 644 are respectively connected to the negative poles of some battery cells 6. The power source contact 611 and the ground contact 641 are respectively connected to the positive pole and the negative pole of an external electronic device. The first and second test contacts 621 and 631 may be used to test the voltage of the battery cells 6. Each pole contact 622, 623, and 624 is used to connect the positive pole of a battery cell 6 and the negative pole of another battery cell 6.

The connections between each pole contact 622, 623, or 624 and battery cells 6 may be referred to those as shown in FIG. 6, and thus they will not be described herein again.

Accordingly, there are 19 contacts provided by the conductive elements. The total of battery cells 6 is nine and the number of battery cells in series connection is three. Therefore, these numbers conform to the equation (3). That is, the method for fabricating a battery shell according to the third embodiment can be implemented.

Based on the above, according to the methods for fabricating a battery shell, conductive elements are embedded in the casing by way of insert molding. As a result, the volume of the battery shell decreases and the battery shell with smaller size can benefit the miniaturization of an electronic device. Furthermore, embedding conductive elements in the casing by way of insert molding can save the process of assembling the conductive elements to the casing, and thus fabricating hours can be reduced. Additionally, the conductive elements in the casing can increase the structural strength of the battery shell and improve the reliability of electronic devices.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A method for fabricating a battery shell, the battery shell is configured to contain n battery cells arranged in at least one series connection, wherein the number of battery cells in each series connection is s, the method comprises:
    providing a plurality of conductive elements, the plurality of conductive elements having m contacts; and
    forming a casing by way of insert molding, wherein the insert molding embeds the conductive elements in the casing and leaves the m contacts exposed;
    wherein m=(2×n)+(s+1) and the conductive elements are adapted to connect the battery cells through the contacts.

2. The method according to claim 1, wherein the plurality of conductive elements comprise a first conductive element, a second conductive element, and a third conductive element, the m contacts comprise a power source contact, a test contact, a ground contact, a plurality of positive pole contacts, and a plurality of negative pole contacts, the first conductive element has the power source contact and two positive pole contacts, the second conductive element has the test contact, two positive pole contacts, and two negative pole contacts, and the third conductive element has the ground contact and two negative pole contacts.

3. The method according to claim 1, wherein the plurality of conductive elements comprise a first conductive element, a second conductive element, a third conductive element, a fourth conductive element, and a fifth conductive element, the m contacts comprise a power source contact, a first test contact, a second test contact, a third test contact, a ground contact, a plurality of positive pole contacts, and a plurality of negative pole contacts, the first conductive element has the power source contact and two positive pole contacts, the second conductive element has the first test contact, two positive pole contacts, and two negative pole contacts, the third conductive element has the second test contact, two positive pole contacts, and two negative pole contacts, the fourth conductive element has the third test contact, two positive pole contacts, and two negative pole contacts, and the fifth conductive element has the ground contact and two negative pole contacts.

4. The method according to claim 1, wherein the plurality of conductive elements are made of copper or nickel materials.

5. The method according to claim 1, wherein the casing is made of insulation plastic.

6. A method for fabricating a battery shell, the battery shell is configured to contain n battery cells arranged in at least one series connection, wherein the number of battery cells in each series connection is s, and s is an even integer, the method comprises:
    providing a plurality of conductive elements, the plurality of conductive elements having m contacts; and
    forming a casing by way of insert molding, wherein the insert molding embeds the conductive elements in the casing and leaves the m contacts exposed;
    wherein the plurality of conductive elements are embedded in the casing, and m=(1.5×n)+(s+1) and the conductive elements are adapted to connect the battery cells through the contacts.

7. The method according to claim 6, wherein the plurality of conductive elements comprise a first conductive element, a second conductive element, and a third conductive element, the m contacts comprise a power source contact, a test contact, a ground contact, two positive pole contacts, two negative pole contacts, and two pole contacts, the first conductive element has the power source contact and two positive pole contacts, the second conductive element has the test contact and two pole contacts, and the third conductive element has the ground contact and two negative pole contacts.

8. The method according to claim 6, wherein the plurality of conductive elements comprise a first conductive element, a second conductive element, a third conductive element, a fourth conductive element, and a fifth conductive element, the m contacts comprise a power source contact, a first test contact, a second test contact, a third test contact, a ground contact, a plurality of positive pole contacts, a plurality of negative pole contacts, and a plurality of pole contacts, the first conductive element has the power source contact and two positive pole contacts, the second conductive element has the first test contact and two pole contacts, the third conductive element has the second test contact, two positive pole contacts, and two negative pole contacts, the fourth conductive element has the third test contact and two pole contacts, and the fifth conductive element has the ground contact and two negative pole contacts.

9. The method according to claim 6, wherein the plurality of conductive elements are made of copper or nickel materials.

10. The method according to claim 6, wherein the casing is made of insulation plastic.

11. A method for fabricating a battery shell, the battery shell is configured to contain n battery cells arranged in at least one series connection and at least one parallel connection, wherein the number of battery cells in each series connection is s and the number of battery cells in each parallel connection is p, wherein s is an odd integer, the method comprises:

provideing a plurality of conductive elements, the plurality of conductive elements having m contacts; and forming a casing by way of insert molding, wherein the insert molding embeds the conductive elements in the casing and leaves the m contacts exposed;

wherein the plurality of conductive elements are embedded in the casing, and $m=(1.5 \times n)+(s+1+0.5p)$ and the conductive elements are adapted to connect battery cells through the contacts.

12. The method according to claim 11, wherein the plurality of conductive elements comprise a first conductive element, a second conductive element, a third conductive element, and a fourth conductive element, the m contacts comprise a power source contact, a first test contact, a second test contact, a ground contact, a plurality of positive pole contacts, a plurality of negative pole contacts, and two pole contacts, the first conductive element has the power source contact and two positive pole contacts, the second conductive element has the first test contact and two pole contacts, the third conductive element has the second test contact, two positive pole contact, and two negative pole contact, the fourth conductive element has the ground contact and two negative pole contacts.

13. The method according to claim 11, wherein the plurality of conductive elements comprise a first conductive element, a second conductive element, a third conductive element, and a fourth conductive element, the m contacts comprise a power source contact, a first test contact, a second test contact, a ground contact, a plurality of positive pole contacts, a plurality of negative pole contacts, and a plurality of pole contacts, the first conductive element has the power source contact and three positive pole contacts, the second conductive element has the first test contact and three pole contacts, the third conductive element has the second test contact, three positive pole contacts, and three negative pole contacts, the fourth conductive element has the third test contact and three negative pole contacts.

14. The method according to claim 11, wherein the plurality of conductive elements are made of copper or nickel materials.

15. The method according to claim 11, wherein the casing is made of insulation plastic.

16. The method according to claim 1, wherein the battery cells are not present during the insert molding.

* * * * *